US012722376B2

(12) United States Patent
Park et al.

(10) Patent No.: US 12,722,376 B2
(45) Date of Patent: Sep. 1, 2026

(54) INKJET PRINTING APPARATUS

(71) Applicant: Genix Corporation, Seongnam-si (KR)

(72) Inventors: Steve Park, Seongnam-si (KR); Yong Hak Kim, Uijeongbu-si (KR); Duk Hyun Ko, Suwon-si (KR)

(73) Assignee: Genix Corporation, Seongnam-si (KR)

( * ) Notice: Subject to any disclaimer, the term of this patent is extended or adjusted under 35 U.S.C. 154(b) by 240 days.

(21) Appl. No.: 18/402,502

(22) Filed: Jan. 2, 2024

(65) Prior Publication Data

US 2025/0074059 A1 Mar. 6, 2025

(30) Foreign Application Priority Data

Aug. 30, 2023 (KR) ........................ 10-2023-0114603

(51) Int. Cl.
*B41J 2/165* (2006.01)

(52) U.S. Cl.
CPC ....... *B41J 2/16505* (2013.01); *B41J 2/16508* (2013.01); *B41J 2/16552* (2013.01); *B41J 2/16579* (2013.01); *B41J 2002/16558* (2013.01); *B41J 2002/16594* (2013.01)

(58) Field of Classification Search
CPC . B41J 2/16505; B41J 2/16508; B41J 2/16552
See application file for complete search history.

(56) References Cited

U.S. PATENT DOCUMENTS

2020/0254761 A1* 8/2020 Levy .................... B41J 2/16523
2020/0254765 A1* 8/2020 McConville ......... B41J 2/16508
2021/0206170 A1 7/2021 Kobayashi et al.

FOREIGN PATENT DOCUMENTS

JP 2006-150937 A 6/2006
JP 2009000911 A * 1/2009
JP 2011-051281 A 3/2011
JP 2017128010 A * 7/2017 .......... B41J 2/16505
JP 2017-193159 A 10/2017
JP 2018-171848 A 11/2018
KR 10-2009-0067890 A 6/2009

OTHER PUBLICATIONS

Office Action issued in Korean Patent Application No. 10-2023-0114603, dated Feb. 20, 2024, in 5 pages.

* cited by examiner

*Primary Examiner* — Sharon Polk
(74) *Attorney, Agent, or Firm* — Knobbe, Martens, Olson & Bear, LLP

(57) ABSTRACT

An inkjet printing apparatus is proposed. The inkjet printing apparatus may include an inkjet print head including at least one nozzle configured to spray ink onto a print medium. The apparatus may also include a cap configured to be coupled to at least one area of the inkjet print head, and configured to protect the at least one nozzle when coupled to the inkjet print head. The cap may include an accommodation space opened toward the at least one nozzle. The accommodation space may accommodate cleaning liquid for preventing ink from coagulating in the at least one nozzle.

17 Claims, 11 Drawing Sheets

10

INKJET PRINTING APPARATUS

CROSS-REFERENCE TO RELATED APPLICATION

This application claims the benefit of Korean Patent Application No. 10-2023-0114603, filed on Aug. 30, 2023, in the Korean Intellectual Property Office, the disclosure of which is incorporated herein in its entirety by reference.

BACKGROUND

Technical Field

The disclosure relates to an inkjet printing apparatus, and more particularly, to an inkjet printing apparatus capable of maintaining a nozzle always in a wet state.

Description of Related Technology

An inkjet printing apparatus is used to print an image having a certain color at a desired location on a surface of a print medium by ejecting a fine-sized droplet of ink for printing by using an inkjet print head.

The inkjet printing apparatus may include an ink reservoir where ink is stored, and the ink stored in the ink reservoir may be supplied to an inkjet print head through an ink supply device. The supplied ink may be ejected onto the print medium, such as paper, a film, fiber, and the like, through a nozzle of the inkjet print head, so as to print an image.

SUMMARY

One aspect is an inkjet printing apparatus, which may maintain a nozzle always in a wet state through cleaning liquid accommodated in a maintenance unit.

Another aspect is an inkjet printing apparatus, which is improved such that, when a maintenance unit is combined with an inkjet print head, a nozzle is not exposed to air.

Another aspect is an inkjet printing apparatus that includes an inkjet print head including at least one nozzle configured to spray ink onto a print medium, and a cap capable of being coupled to at least one area of the inkjet print head, and configured to protect the at least one nozzle when coupled to the inkjet print head, wherein the cap includes an accommodation space opened toward the at least one nozzle, and cleaning liquid for preventing ink from coagulating in the at least one nozzle is accommodated in the accommodation space.

Aspects of the disclosure are not limited to the above-described aspects, and other aspects that are not mentioned herein would be clearly understood by a person skilled in the art from the description of the disclosure.

BRIEF DESCRIPTION OF THE DRAWINGS

These and/or other aspects will become apparent and more readily appreciated from the following description of the embodiments, taken in conjunction with the accompanying drawings.

DETAILED DESCRIPTION

Figure 1:
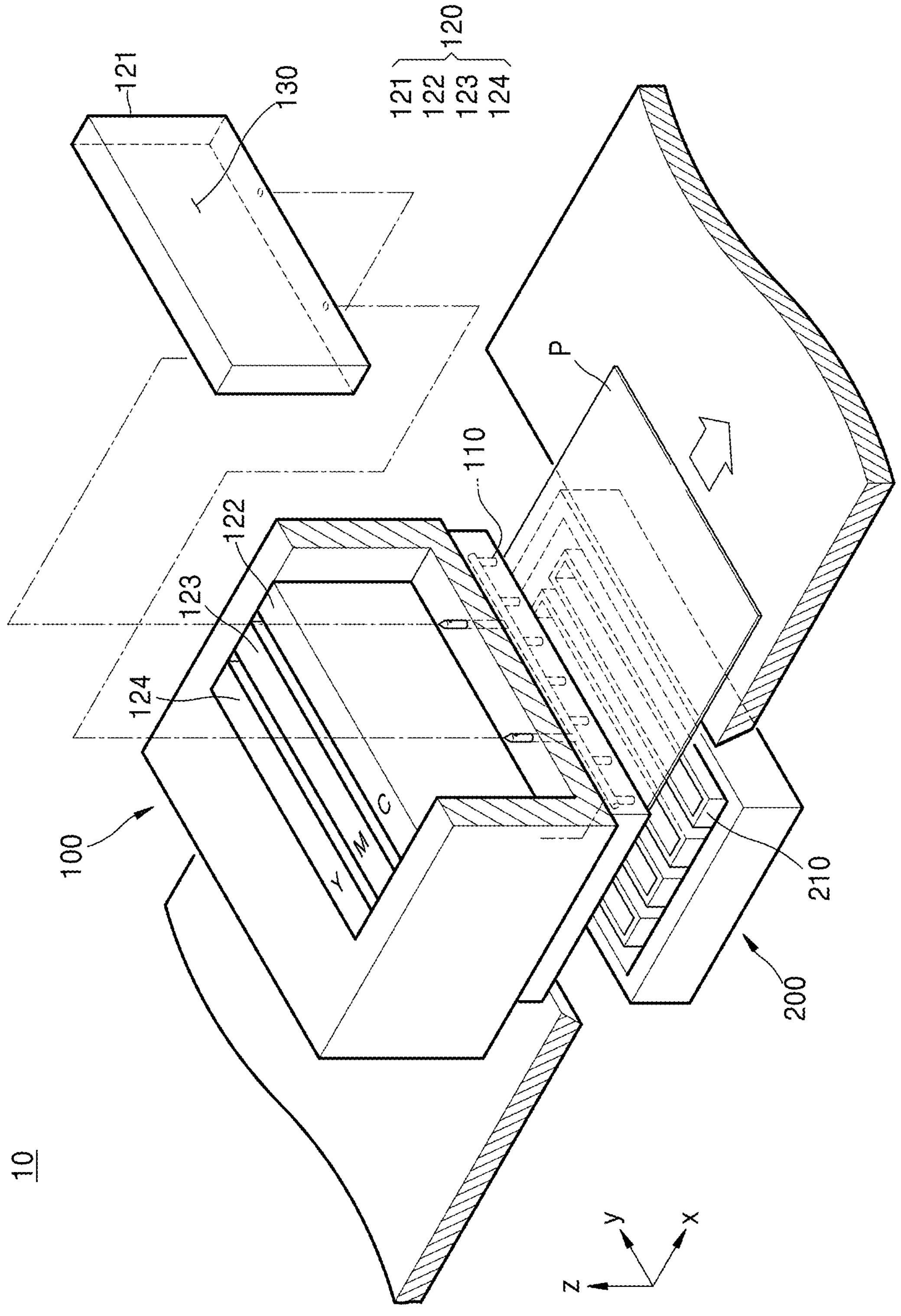
FIG. 1 is a perspective view of a portion of an inkjet printing apparatus according to an embodiment.

A nozzle of an inkjet print head may be exposed to air. When the ink left in the nozzle is exposed to contact air, a phenomenon in which the ink dries, coagulates, or the like may occur. This may be followed by a nozzle clogging phenomenon. Accordingly, a normal use of an inkjet printing apparatus is impossible, so that the inkjet print head needs to be replaced.

When the inkjet printing apparatus is frequently used, as wet ink is periodically supplied to the nozzle so that coagulation of ink may be prevented. However, when the inkjet printing apparatus is not used frequently, for example, the inkjet printing apparatus is left in a standby mode for a long time, and the like, the ink in the nozzle coagulates and thus the nozzle is easily clogged.

In particular, when white ink is used in the inkjet printing apparatus, particles of white ink are relatively thick and heavy, and thus, the white ink is easily separated into a pigment and a liquid component, as time passes. The separated pigment coagulates in the nozzle so that the nozzle is easily clogged.

As a solution to prevent the phenomenon, a solution of managing an ink print head by using a maintenance unit that can be combined with the inkjet print head, the maintenance unit periodically wiping the nozzle or sucking the ink remaining in the nozzle, has been proposed.

However, even when the maintenance unit is combined with the inkjet print head, if an air inflow path through which the nozzle and a fluid communicate with each other exists in the maintenance unit, there is a limit that, when power supply to the maintenance unit is cut off, the ink in the nozzle is dried or coagulated. So a new solution is needed.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The terms used in the disclosure have been selected from currently widely used general terms in consideration of the functions in the disclosure. However, the terms may vary according to the intention of one of ordinary skill in the art, case precedents, and the advent of new technologies. Also, for special cases, meanings of the terms selected by the applicant are described in detail in the description section. Accordingly, the terms used in the disclosure are defined based on their meanings in relation to the contents discussed throughout the specification, not by their simple meanings.

When a part may "include" a certain constituent element, unless specified otherwise, it may not be construed to exclude another constituent element but may be construed to further include other constituent elements. Furthermore, terms such as "... portion," "... unit," "... module," and "... block" stated in the specification may signify a unit to process at least one function or operation and the unit may be embodied by hardware, software, or a combination of hardware and software.

As used in the disclosure, when an expression such as "at least any one of" is arranged before a list of constituent elements, the expression modifies the entire constituent elements rather than each arranged constituent element. In the disclosure, expressions such as "at least one of a, b, or c" may denote "a", "b", "c", "a and b", "a and c", "b and c", "all of a, b, and c", or modifications thereof.

In the disclosure, the "inkjet printing apparatus" may mean an apparatus capable of printing an image on a print medium in a manner of ejecting ink particles of a fine size at a desired location on the print medium.

The embodiment of the disclosure is described with reference to the accompanying drawings so that one skilled in the art to which the disclosure pertains can work the disclosure. The disclosure may be worked in an implementable form in the inkjet printing apparatuses of various embodiments described above or implemented and worked in various different forms and may not limited to the embodiments described herein.

FIG. 1 is a perspective view of a portion of an inkjet printing apparatus 10 according to an embodiment.

Referring to FIG. 1, the inkjet printing apparatus 10 according to an embodiment may include an inkjet print head 100 and a maintenance unit 200.

The inkjet printing apparatus 10 according to an embodiment may include the inkjet print head 100 to eject ink for printing (hereinafter, referred to as the ink).

The inkjet print head 100 may print an image on a print medium P by moving along a designated path and ejecting an ink droplet of a fine size (e.g., tens of micrometers) at a desired location on the print medium P. The print medium P may include, for example, at least one of paper, a film or fiber, but the disclosure is not limited thereto.

According to an embodiment, the print medium P may move in a first direction (e.g., an x-axis direction in FIG. 1), and the inkjet print head 100 at a fixed position may eject ink droplets onto the print medium P that is moved. However, a method of ejecting ink droplets by the inkjet print head 100 is not limited thereto.

According to another embodiment, the print medium P may move in the first direction to arrive at the inkjet print head 100, and while moving in a second direction (e.g., a y-axis direction in FIG. 1) crossing the first direction, the inkjet print head 100 may eject ink droplets onto the print medium P that has arrived at the inkjet print head 100.

According to another embodiment, while moving in the second direction, the inkjet print head 100 may eject ink droplets onto the print medium P moving in the first direction.

The inkjet print head 100 may include at least one nozzle 110, at least one cartridge 120, and a piezoelectric element 140.

The at least one nozzle 110 may have a fluid connection or may be communicated with the inside of the at least one cartridge 120, and may eject droplets of ink stored in the at least one cartridge 120 onto the print medium P.

According to an embodiment, the at least one nozzle 110 may be located under the inkjet print head 100 (e.g., in a −z direction in FIG. 1) adjacent to the print medium P, but the disclosure is not limited thereto.

According to another embodiment, the at least one nozzle 110 may be regularly arranged at designated intervals. In some embodiments, the at least one nozzle 110 may be arranged at irregular intervals.

The at least one cartridge 120 may include an ink chamber 130 for storing ink of various colors and an ink flow path 131 connecting the ink chamber 130 to the at least one nozzle 110.

According to an embodiment, the at least one cartridge 120 may be fluid connected to or communicated with an ink reservoir (not shown) located outside the inkjet print head 100 through an ink supply flow path (not shown), and the ink supplied from the ink reservoir may be stored in the ink chamber 130 formed in an inner space of the at least one cartridge 120. In this state, the at least one cartridge 120 may include one ink chamber 130.

The at least one cartridge 120 may include an ink inlet (not shown), and the ink stored in the ink reservoir may arrive at the ink inlet through the ink supply flow path and then may be introduced into the ink chamber 130 through the ink inlet.

The ink stored in the ink chamber 130 may be moved in a direction toward the at least one nozzle 110 through the ink flow path 131 and then ejected to the outside of the inkjet print head 100 in the form of droplets.

According to an embodiment, the at least one cartridge 120 may include a first cartridge 121 for storing black (key or black) ink, a second cartridge 122 for storing cyan ink, a third cartridge 123 for storing magenta ink, and a fourth cartridge 124 for storing yellow ink. However, the number of cartridges and the type of ink stored in the at least one cartridge 120 are not limited to the embodiment described above.

The piezoelectric element 140 may provide a drive force for ejecting the ink located on the ink flow path 131 to the outside of the inkjet print head 100 through the at least one nozzle 110.

According to an embodiment, the piezoelectric element 140 may be physically deformed (e.g., contracted or expanded) according to the supply of an electrical signal. Due to the physical deformation of the piezoelectric element 140, a certain pressure may be applied to the ink flow path 131 adjacent to the piezoelectric element 140, and the ink located in the ink flow path 131 may be ejected to the outside of the inkjet print head 100 through the at least one nozzle 110 by the pressure applied from the piezoelectric element 140.

The print ejection method of the inkjet printing apparatus 10 is not limited to the piezoelectric method described above, and may include various methods. As an example, an inkjet printing apparatus adopting a thermal transfer method may eject ink using heat generated in a microelectrode. In another example, an inkjet printing apparatus adopting an electrostatic method may eject ink using an electrostatic force.

The inkjet printing apparatus 10 may protect the inkjet print head 100 and include the maintenance unit 200 for preventing evaporation of the ink stored in the inkjet print head 100.

The maintenance unit 200 may be detachably coupled to in an area of the inkjet print head 100. For example, the maintenance unit 200 may be detachably coupled to a lower portion of the inkjet print head 100 (e.g., in a −z direction of FIG. 1).

The maintenance unit 200 may include at least one cap 210 to protect the at least one nozzle 110 of the inkjet print head 100. The number of caps may be the same as the number of cartridges and the number of ink chambers.

One cap 210 may correspond to one cartridge 120 and one chamber 130 formed inside the at least one cartridge 120. One cap 210 may be coupled to an area of the inkjet print head 100 where the at least one nozzle 110 is arranged, at a location facing the at least one cartridge 120 corresponding thereto.

In the following description, the structure and function of the at least one cap 210 are described in detail with reference to FIG. 2.

Figure 2:
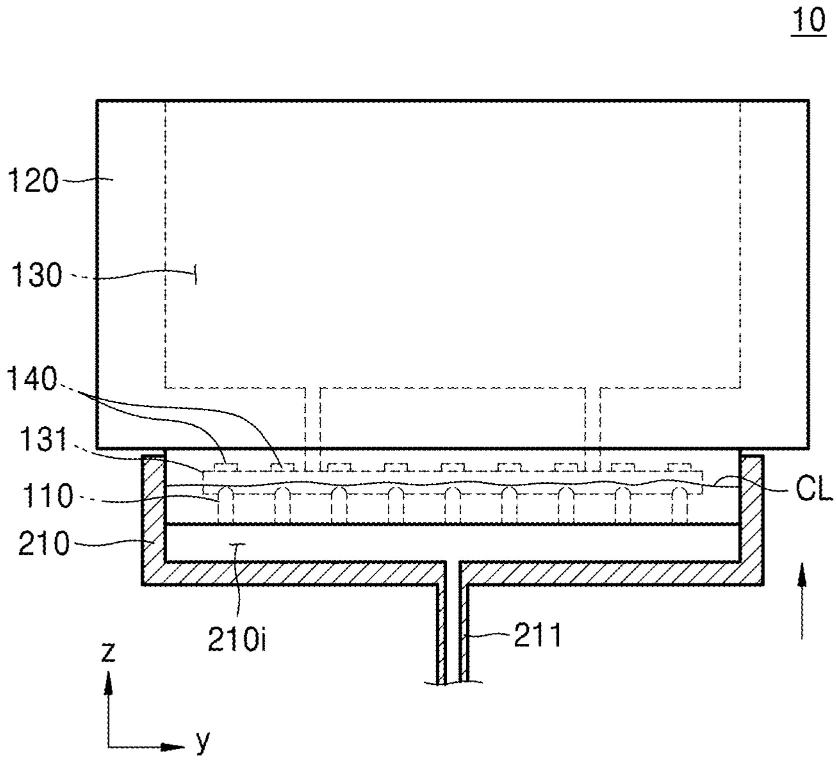
FIG. 2 is a cross-sectional view showing a state in which an inkjet print head and a cap of the inkjet printing apparatus of FIG. 1 are coupled to each other.

FIG. 2 is a cross-sectional view showing a state in which an inkjet print head and a cap of the inkjet printing apparatus of FIG. 1 are coupled to each other.

Referring to FIG. 2, the at least one cap 210 may be located in a lower end (e.g., in a −z direction of FIG. 2) of an inkjet print head (e.g., the inkjet print head 100 of FIG. 1). The at least one cap 210 may include an accommodation space **210*i* for accommodating at least one part of the inkjet print head 100 when coupled to the inkjet print head 100**.

The at least one cap 210 may be moved in the z direction by a driving device (not shown) arranged inside the maintenance unit 200, and coupled to the inkjet print head 100, or moved in the −z direction and separated from the inkjet print head 100.

The driving device may be, for example, a cam contacting at least one area of the at least one cap 210. The at least one cap 210 may be moved in the z direction or the −z direction according to the clockwise or counterclockwise rotation of the cam.

The inkjet printing apparatus 10 may control such that the at least one cap 210 is coupled to the inkjet print head 100 through the driving device described above, only when the inkjet print head 100 is not operating.

When the at least one cap 210 is located in the −z direction of the inkjet print head 100 to be coupled to the inkjet print head 100, the accommodation space **210*i* of the at least one cap 210 may be open toward the at least one nozzle 110. When the at least one cap 210 is coupled to the inkjet print head 100 and thus the accommodation space 210*i* of the at least one cap 210 accommodates at least one part of the inkjet print head 100, the at least one cap 210 may be arranged to surround an area of the inkjet print head 100 where the at least one nozzle 110 is located and protect the at least one nozzle 110** from external shocks.

Furthermore, the at least one cap 210 may prevent the at least one nozzle 110 from being exposed to the outside of the inkjet print head 100, to prevent the ink remaining in the at least one nozzle 110 from contacting air so as to be dried or coagulated. Accordingly, a phenomenon in which the at least one nozzle 110 is clogged by coagulated ink may be prevented. In the following description, ink hardening, such as being dried, coagulated, or the like, is collectively referred to as ink coagulation.

In order to reduce the ink remaining in the at least one nozzle 110 from coagulating, the at least one cap 210 of the inkjet printing apparatus 10 according to an embodiment may accommodate cleaning liquid CL in the accommodation space **210*i* that accommodates at least a part of the inkjet print head 100**.

The cleaning liquid CL may include various ingredients to prevent ink from coagulating. As an example, the cleaning liquid CL may include 10 wt % to 30 wt % of glycerol, 1 wt % to 5 wt % of ethoxylated tetramethyldecynediol, and 0.01 wt % to 0.05 wt % of 1,2-benzisothiazol-3(2h)-one. In another example, the cleaning liquid CL may include 10 wt % to 30 wt % of 2-pyrrolidinone, 5 wt % to 13 wt % of ethylene glycol, 1 wt % to 3 wt % of ethoxylated tetramethyldecynediol, 0.1 wt % to 1 wt % of triethanolamine, and 0.01 wt % to 0.05 wt % of 1,2-benzisothiazol-3(2h)-one. In another example, the cleaning liquid CL may include 7 wt % to 13 wt % of ethylene glycol, 1 wt % to 3 wt % of ethoxylated tetramethyldecynediol, 0.1 wt % to 1.5 wt % of triethanolamine, and 0.01 wt % to 0.05 wt % of 1,2-benzisothiazol-3(2h)-one.

In another example, the cleaning liquid CL may include 20 wt % to 30 wt % of glycol, less than 10 wt % of glycerin, less than 3 wt % of surfactant, and 55 wt % to 75 wt % of water. In another example, the cleaning liquid CL may include 1 wt % to 10 wt % of ethane-1,2-diol, and 90 wt % or more of non-regulated ingredients.

When the at least one nozzle 110 is brought into contact with the cleaning liquid CL, the at least one nozzle 110 may always maintain a wet state. In other words, the cleaning liquid CL accommodated in the at least one cap 210 may prevent coagulation of the ink remaining in the at least one nozzle 110, and prevent a phenomenon in which the at least one nozzle 110 is clogged.

Even when a maintenance unit (e.g., the maintenance unit 200 of FIG. 1) does not include an element for managing the at least one nozzle 110 by, for example, periodically wiping the at least one nozzle 110, absorbing the ink remaining in the at least one nozzle 110, or the like, or power supply to the maintenance unit 200 is stopped so that the element that manages the at least one nozzle 110 does not operate, if the cleaning liquid CL is accommodated in the at least one cap 210, a clogging phenomenon of the at least one nozzle 110 may be prevented.

Accordingly, a user may relatively easily and conveniently manage the at least one nozzle 110, and the at least one nozzle 110 may maintain a wet state for a long time so that the inkjet printing apparatus 10 may maintain high print quality for a long time.

When ink is not coagulated by the cleaning liquid CL, there may be no need to periodically suck the ink remaining in the nozzle and discharge the ink to the outside. In other words, a separate ink outlet may not be formed in the at least one cap 210.

Considering that air may be introduced into the cap through the ink outlet penetrating the cap, as the at least one cap 210 of the inkjet printing apparatus 10 according to an embodiment does not include the ink outlet, the at least one nozzle 110 or the ink remaining in the at least one nozzle 110 contacting air may be reduced. Accordingly, the at least one nozzle 110 may stably eject ink for a long time without a clogging phenomenon due to the ink coagulation.

The at least one cap 210 may include a cleaning liquid inlet 211 for introducing the cleaning liquid CL into the accommodation space 210*i*. The cleaning liquid inlet 211 may be formed to penetrate at least a part of the at least one cap 210. In this state, in order to reduce the introduction of air through the cleaning liquid inlet 211, the opening/closing of the cleaning liquid inlet 211 may be controlled by a valve. Furthermore, a portion where the cleaning liquid inlet 211 is connected to a cleaning liquid supply path (not shown) may be sealed by a sealing member (not shown). For example, the sealing member may be arranged to surround the connection portion between the cleaning liquid inlet 211 and the cleaning liquid supply path.

In the following description, the elements of an inkjet printing apparatus to prevent the coagulation of ink existing in the at least one nozzle 110 is described with reference to FIG. 3.

Figure 3:
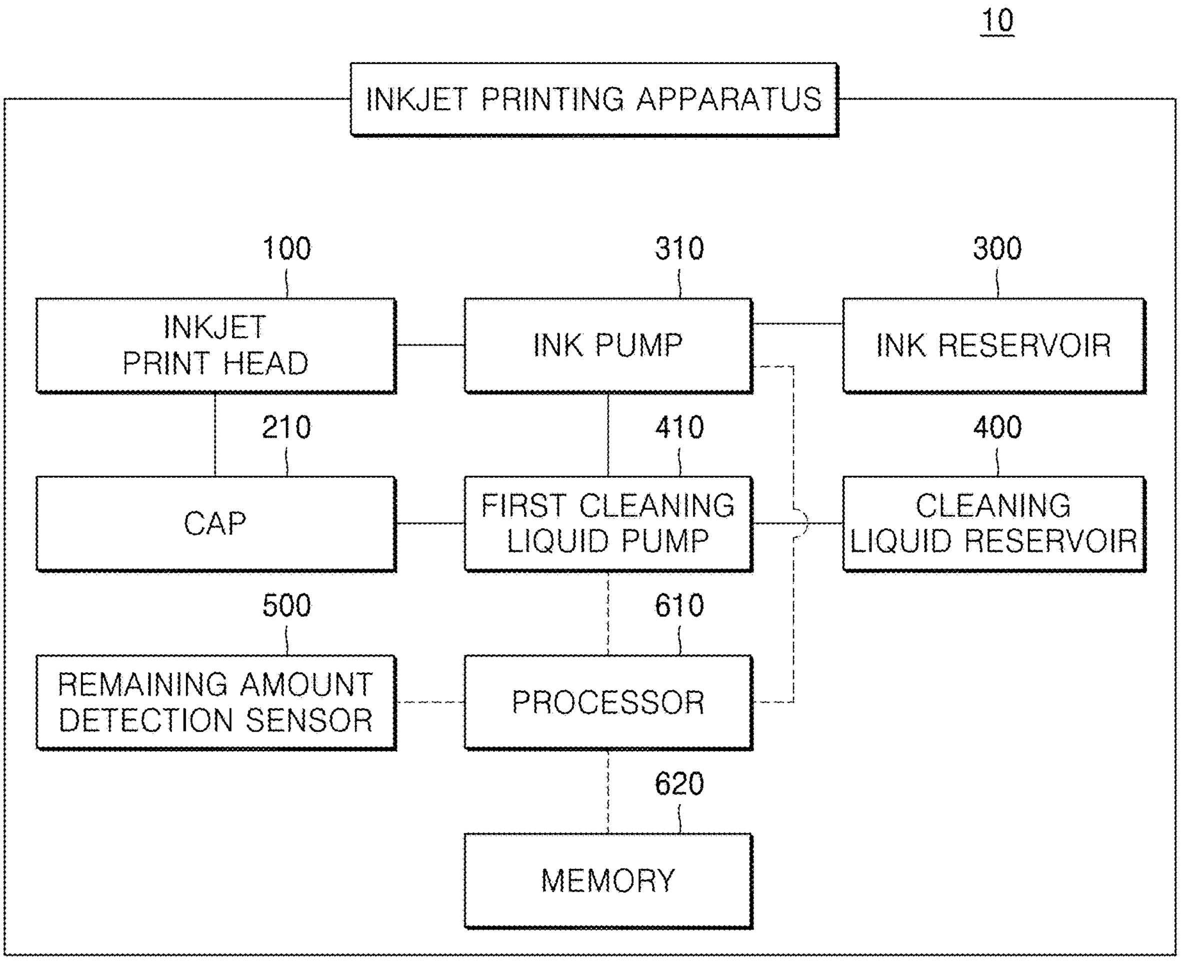
FIG. 3 is a block diagram showing the elements of an inkjet printing apparatus according to an embodiment.

FIG. 3 is a block diagram showing the elements of the inkjet printing apparatus 10 according to an embodiment.

Referring to FIG. 3, the inkjet printing apparatus 10 according to an embodiment may include the inkjet print head 100 (e.g., the inkjet print head 100 of FIG. 1), the at least one cap 210 (e.g., the at least one cap 210 of FIG. 1), an ink reservoir 300, a cleaning liquid reservoir 400, a remaining amount detection sensor 500, and a processor 610.

At least one of elements of the inkjet printing apparatus 10 according to an embodiment may be the same as or similar to at least one of the elements of the inkjet printing apparatus 10 of FIG. 1, and in the following description, redundant descriptions are omitted.

The ink reservoir 300 may be located outside the inkjet print head 100 and may store ink. The ink reservoir 300 may be connected to or communicated with an ink chamber (e.g., the ink chamber 130 of FIG. 1) of the inkjet print head 100.

The ink reservoir 300 may be fluid connected to or communicated with the ink chamber through an ink supply flow path (not shown), and the ink stored in the ink reservoir 300 may flow in a direction from the ink reservoir 300 toward the ink chamber through the ink supply flow path.

The inkjet printing apparatus 10 according to an embodiment may further include an ink pump 310 arranged on the ink supply flow path. The ink pump 310 may provide a force to flow the ink stored in the ink reservoir 300 in a direction toward at least one cartridge (e.g., the at least one cartridge 120 of FIG. 1), and the ink stored in the ink reservoir 300 may flow in a direction toward the at least one cartridge by the force provided by the ink pump 310.

The ink from the ink reservoir 300 and arrived at the at least one cartridge may be introduced into the ink chamber through an ink inlet (not shown) formed in the at least one cartridge, and then stored in the ink chamber.

The cleaning liquid reservoir 400 may be located outside the inkjet print head 100, and may store cleaning liquid to be supplied to the at least one cap 210. The cleaning liquid reservoir 400 may be connected to or communicated with an accommodation space (e.g., the accommodation space 210*i* of FIG. 2) of the at least one cap 210.

The cleaning liquid reservoir 400 may be fluid connected to or communicated with the accommodation space of the at least one cap 210 through a cleaning liquid supply path (not shown), and the ink stored in the cleaning liquid reservoir 400 may flow in a direction toward the at least one cap 210 from the cleaning liquid reservoir 400 along the cleaning liquid supply path.

The inkjet printing apparatus 10 according to an embodiment may further include a first cleaning liquid pump 410 arranged on the cleaning liquid supply path. The first cleaning liquid pump 410 may provide a force to flow the cleaning liquid stored in the cleaning liquid reservoir 400 in a direction toward the at least one cap 210. The cleaning liquid stored in the cleaning liquid reservoir 400 may flow in a direction toward the at least one cap 210 by the force provided by the first cleaning liquid pump 410.

The remaining amount detection sensor 500 is provided to detect a remaining amount of the cleaning liquid accommodated in the accommodation space of the at least one cap 210. The remaining amount detection sensor 500 may generate a signal in response to a change in the remaining amount of the cleaning liquid accommodated in the accommodation space of the at least one cap 210. The signal generated in the remaining amount detection sensor 500 may be transmitted to the processor 610. The processor 610 may determine the remaining amount of cleaning liquid based on the signal of the remaining amount detection sensor 500.

The remaining amount detection sensor 500 may detect not only the remaining amount of the cleaning liquid accommodated in the accommodation space of the at least one cap 210, but also the remaining amount of the ink stored in the ink chamber 130. The processor 610 may determine a remaining amount of ink based on the signal of the remaining amount detection sensor 500.

The processor 610 may be electrically connected to the ink pump 310, the first cleaning liquid pump 410, the remaining amount detection sensor 500, and/or a memory 620, to control the general operation of the inkjet printing apparatus 10. The elements controlled by the processor 610 are not limited the example described above. Although not illustrated, the processor 610 may be electrically connected to other pumps and/or valves to control the same.

According to an embodiment, the processor 610 may control the operation of the first cleaning liquid pump 410 based on the signal received from the remaining amount detection sensor 500.

For example, when the remaining amount of the cleaning liquid accommodated in the accommodation space of the at least one cap 210 is not greater than a set value, the processor 610 may determine that ink is insufficient in the accommodation space, and operates the first cleaning liquid pump 410 to supply the cleaning liquid stored in the cleaning liquid reservoir 400 to the accommodation space of the at least one cap 210.

According to another embodiment, the processor 610 may control the operation of the first cleaning liquid pump 410, at set time intervals, to supply the cleaning liquid stored in the cleaning liquid reservoir 400 to the accommodation space of the at least one cap 210.

Aside from the supplying the cleaning liquid to the accommodation space of the at least one cap 210, the at least one cap 210 may include a cleaning liquid outlet (not shown) to discharge the cleaning liquid to the outside of the at least one cap 210. The process of discharging the cleaning liquid through the cleaning liquid outlet may be controlled by the remaining amount detection sensor 500 and/or the processor 610. To reduce the introduction of air through the cleaning liquid outlet, the opening/closing of the cleaning liquid outlet may be controlled by a valve.

As described above, by the operation of the processor 610, the cleaning liquid accommodated in the at least one cap 210 may be periodically replaced so that the cleaning liquid may be maintained in a clean state. Furthermore, a problem generated as the cleaning liquid accommodated in the at least one cap 210 is evaporated (e.g., the coagulation of ink or the clogging of a nozzle) may be prevented. In the disclosure, the "set time interval" may mean a preset time value, and the set time interval may vary depending on a user's manipulation.

The inkjet printing apparatus 10 according to an embodiment may further include the memory 620. The memory 620 may store data needed for the operation of the inkjet printing apparatus 10. For example, the memory 620 may store data for a "set value" and/or a "set time interval" that is a basis for the operation of a pump, but the disclosure is not limited thereto.

In the following description, a configuration for supplying cleaning liquid to the accommodation space of the at least one cap 210 is described.

Figure 4A:
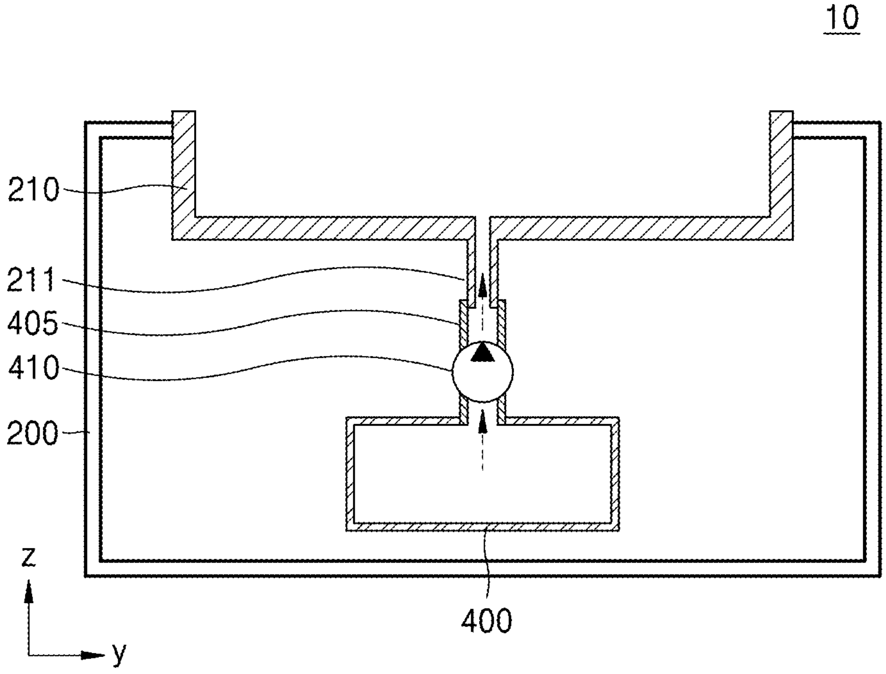
FIGS. 4A and 4B are cross-sectional views each showing an example state in which a cleaning liquid reservoir and a cap of an inkjet printing apparatus according to an embodiment are connected to each other.
Figure 4B:
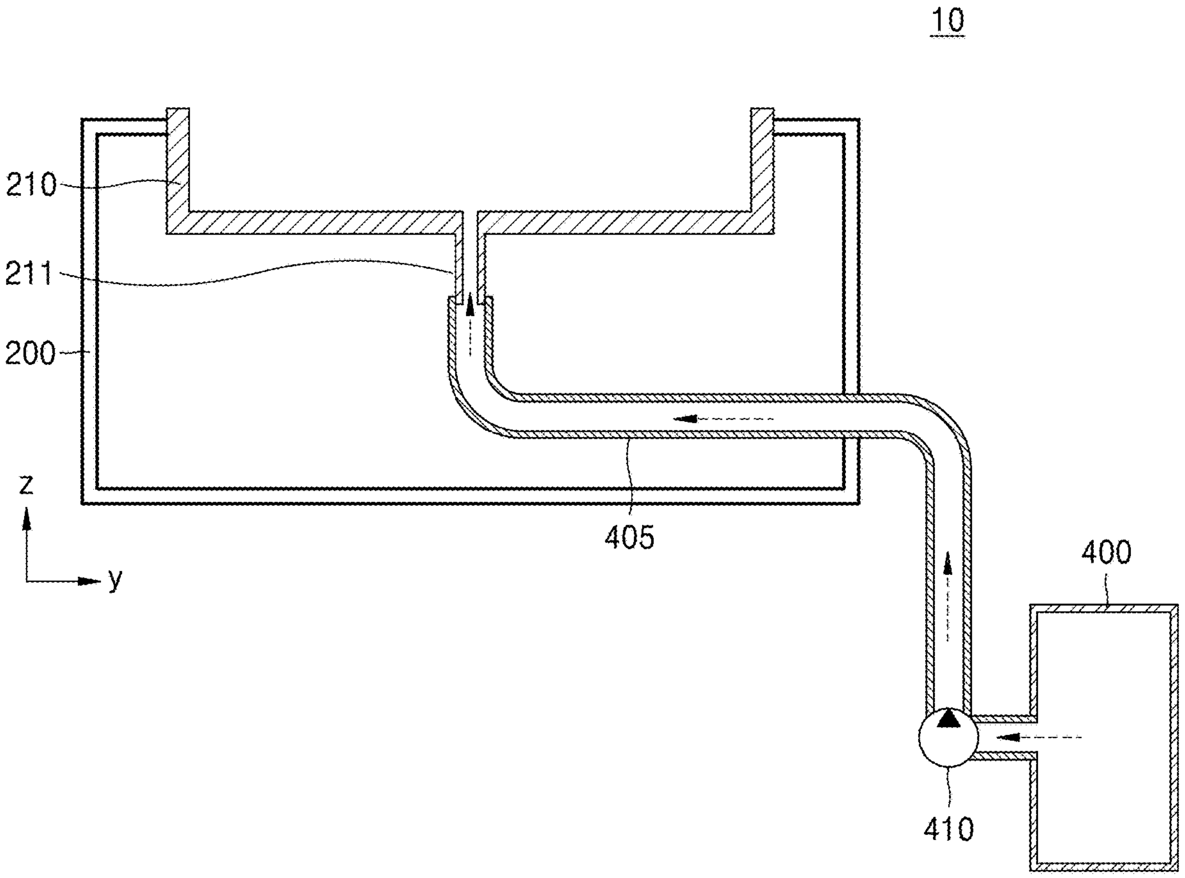

FIGS. 4A and 4B are cross-sectional views each showing an example state in which a cleaning liquid reservoir and a cap of the inkjet printing apparatus 10 according to an embodiment are connected to each other.

Referring to FIGS. 4A and 4B, the inkjet printing apparatus 10 according to an embodiment may include the maintenance unit 200 (e.g., the maintenance unit 200 of FIG. 1), the cleaning liquid reservoir 400 (e.g., the cleaning liquid reservoir 400 of FIG. 3), a cleaning liquid supply path 405, and the first cleaning liquid pump 410 (e.g., the first cleaning liquid pump 410 of FIG. 3).

At least one of the elements of the inkjet printing apparatus 10 illustrated in each of FIGS. 4A and 4B may be the same as or similar to at least one of the elements of the inkjet printing apparatus 10 of FIGS. 1 and 3, and in the following description, redundant descriptions are omitted.

The inkjet printing apparatuses 10 illustrated in FIGS. 4A and 4B are different from each other in the arrangement of the cleaning liquid reservoir 400 and the arrangement of the cleaning liquid supply path 405 and the first cleaning liquid pump 410. In the following description, common contents are first described.

According to an embodiment, the maintenance unit 200 may accommodate at least a part of the at least one cap 210. The other part of the at least one cap 210 that is not accommodated in the maintenance unit 200 may protrude from an upper portion of the maintenance unit 200 toward a lower portion of an inkjet print head (e.g., the inkjet print head 100 of FIG. 1).

The cleaning liquid inlet 211 of the at least one cap 210 may be formed in the bottom of the at least one cap 210 and opened in the z axis direction, but the disclosure is not limited to the present embodiment. The cleaning liquid inlet 211 may be formed in a side surface of the at least one cap 210 and opened in the x-axis or y-axis direction. The cleaning liquid inlet 211 may be fluid connected to the cleaning liquid reservoir 400 through the cleaning liquid supply path 405 and may allow the cleaning liquid to be introduced into the accommodation space of the at least one cap 210 (e.g., the accommodation space 210*i* of FIG. 2).

As the cleaning liquid inlet 211 is formed in the lower portion of the at least one cap 210, even when the upper portion of the at least one cap 210 is coupled to a portion of the inkjet print head, the cleaning liquid inlet 211 may allow the introduction of the cleaning liquid into the accommodation space of the at least one cap 210. In other words, the cleaning liquid may be supplied to the accommodation space of the at least one cap 210 through the cleaning liquid inlet 211 without being disturbed by the inkjet print head.

The first cleaning liquid pump 410 may be arranged on the cleaning liquid supply path 405. The first cleaning liquid pump 410 may provide a force to flow the cleaning liquid stored in the cleaning liquid reservoir 400 toward the accommodation space of the at least one cap 210 through the cleaning liquid inlet 211. In the following description, differences between FIGS. 4A and 4B are described.

Referring to FIG. 4A, the cleaning liquid reservoir 400 may be arranged inside the maintenance unit 200. When the at least one cap 210 is arranged in the upper portion of the maintenance unit 200, the cleaning liquid reservoir 400 may be arranged below the at least one cap 210 and may supply the cleaning liquid toward the at least one cap 210 (e.g., in a +z direction of FIG. 4A). As the cleaning liquid reservoir 400 is arranged inside the maintenance unit 200, the cleaning liquid supply path 405 and the first cleaning liquid pump 410 may be arranged inside the maintenance unit 200.

Referring to FIG. 4B, the cleaning liquid reservoir 400 may be arranged outside the inkjet print head and the maintenance unit 200. The cleaning liquid reservoir 400 may be arranged adjacent to the ink reservoir, for example, parallel to an ink reservoir (e.g., the ink reservoir 300 of FIG. 3). The cleaning liquid reservoir 400, together with the liquid reservoir, may form one reservoir.

The cleaning liquid supply path 405 may fluid connect the cleaning liquid inlet 211 and the cleaning liquid reservoir 400 to each other and may connect the outside and the inside of the maintenance unit 200 to each other. The first cleaning liquid pump 410 may be arranged outside the inkjet print head and the maintenance unit 200. The first cleaning liquid pump 410 may be arranged adjacent to the ink pump, for example, parallel to an ink pump (e.g., the ink pump 310 of FIG. 3). The first cleaning liquid pump 410 and the cleaning liquid reservoir 400 may be arranged adjacent to each other.

Figure 5:
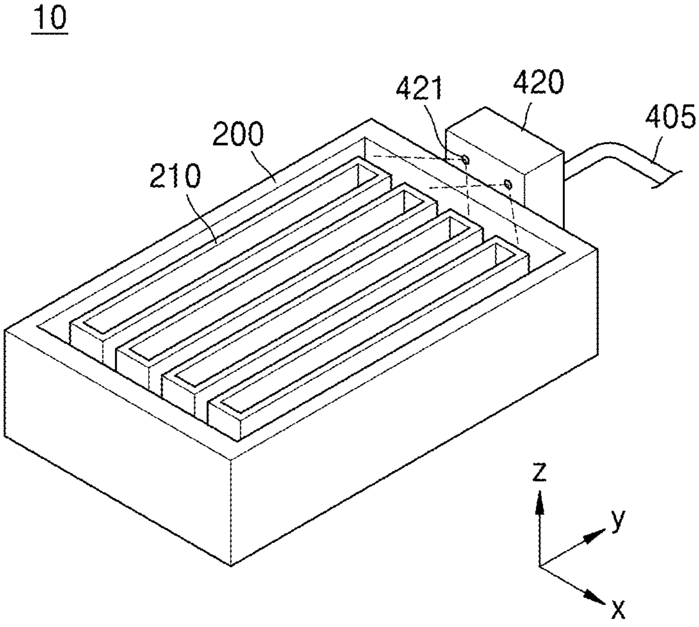
FIG. 5 is a perspective view of a cleaning liquid sprayer and a cap of an inkjet printing apparatus according to another embodiment.

FIG. 5 is a perspective view of a cleaning liquid sprayer and a cap of the inkjet printing apparatus 10 according to another embodiment.

Referring to FIG. 5, the inkjet printing apparatus 10 according to another embodiment may include the maintenance unit 200 (e.g., the maintenance unit 200 of FIG. 1) and a cleaning liquid sprayer 420.

At least one of elements of the inkjet printing apparatus 10 illustrated in FIG. 5 may be the same as or similar to at least one of the elements of the inkjet printing apparatus 10 of FIGS. 1 and 3, and in the following description, redundant descriptions are omitted.

The inkjet printing apparatus 10 according to another embodiment may include the cleaning liquid sprayer 420 for spraying the cleaning liquid to the accommodation space of the at least one cap 210 (e.g., the accommodation space 210*i* of FIG. 2). The cleaning liquid sprayer 420 may be arranged adjacent to one or more the at least one cap 210 arranged in the maintenance unit 200 and may spray the cleaning liquid toward the accommodation space of the at least one cap 210.

The cleaning liquid sprayer 420 may be arranged outside the maintenance unit 200, but the disclosure is not limited to the present embodiment. The cleaning liquid sprayer 420, together with the at least one cap 210, may be accommodated in the maintenance unit 200. Furthermore, the shape of the cleaning liquid sprayer 420 is not limited to the embodiment illustrated in FIG. 5.

The cleaning liquid sprayer 420 may be connected to a cleaning liquid reservoir (e.g., the cleaning liquid reservoir 400 of FIG. 3) through the cleaning liquid supply path 405, and may receive the cleaning liquid. The cleaning liquid sprayer 420 that received the cleaning liquid may spray the cleaning liquid toward the accommodation space of the at least one cap 210 through a cleaning liquid spray nozzle 421.

In order to provide a drive force to spray the cleaning liquid, the cleaning liquid sprayer 420 may include an actuator (not shown). The actuator may include a piezoelectric element, but the disclosure is not limited thereto. The actuator may include various methods and configurations for spraying the cleaning liquid through the cleaning liquid spray nozzle 421.

The cleaning liquid sprayer 420 may include at least one cleaning liquid spray nozzle 421. The cleaning liquid spray nozzle 421 may include as many as cleaning liquid spray nozzles enough to spray the cleaning liquid to all caps 210 accommodated in the maintenance unit 200. Although FIG. 5 illustrates that two cleaning liquid spray nozzles 421 are arranged, the disclosure is not limited the illustration.

The cleaning liquid sprayer 420 may spray the cleaning liquid toward the at least one cap 210 when the at least one cap 210 is separated from an inkjet print head (e.g., the inkjet print head 100 of FIG. 1). The at least one cap 210 and the inkjet print head are separated from each other by the at least one cap 210 coupled to the inkjet print head moving away from the inkjet print head, the inkjet print head moving away from the at least one cap 210, or the like, and when the cleaning liquid is supplied to the accommodation space of the at least one cap 210 by the cleaning liquid sprayer 420, the at least one cap 210 and the inkjet print head may be coupled again to each other.

However, the condition in which the cleaning liquid is sprayed from the cleaning liquid sprayer 420 is not limited to the example described above. The cleaning liquid sprayer 420 may spray the cleaning liquid toward the accommodation space of the at least one cap 210 in a state in which the at least one cap 210 is coupled to the inkjet print head.

As the cleaning liquid is supplied to the at least one cap 210 through the cleaning liquid sprayer 420, a separate cleaning liquid inlet (e.g., the cleaning liquid inlet 211 of FIG. 2) may not be arranged in the at least one cap 210. Considering that air may be introduced into the accommodation space of the at least one cap 210 through the cleaning liquid inlet penetrating the at least one cap 210, as the at least one cap 210 of the inkjet printing apparatus 10 according to another embodiment does not include an inlet and an outlet, contact of a nozzle (e.g., the at least one nozzle 110 of FIG. 2) or ink remaining in the nozzle with air may be reduced.

Furthermore, considering that the cleaning liquid may flow back through the cleaning liquid inlet, the at least one cap 210 of the inkjet printing apparatus 10 according to another embodiment may prevent unnecessary leakage of the cleaning liquid through the cleaning liquid inlet.

In order to maintain the cleaning liquid accommodated in the at least one cap 210 in a clean state, it is necessary not only to supply a new cleaning liquid to the at least one cap 210, but also to discharge the cleaning liquid in the at least one cap 210 to the outside. In the following description, a configuration for discharging the cleaning liquid from the accommodation space of the at least one cap 210 is described.

Figure 6:
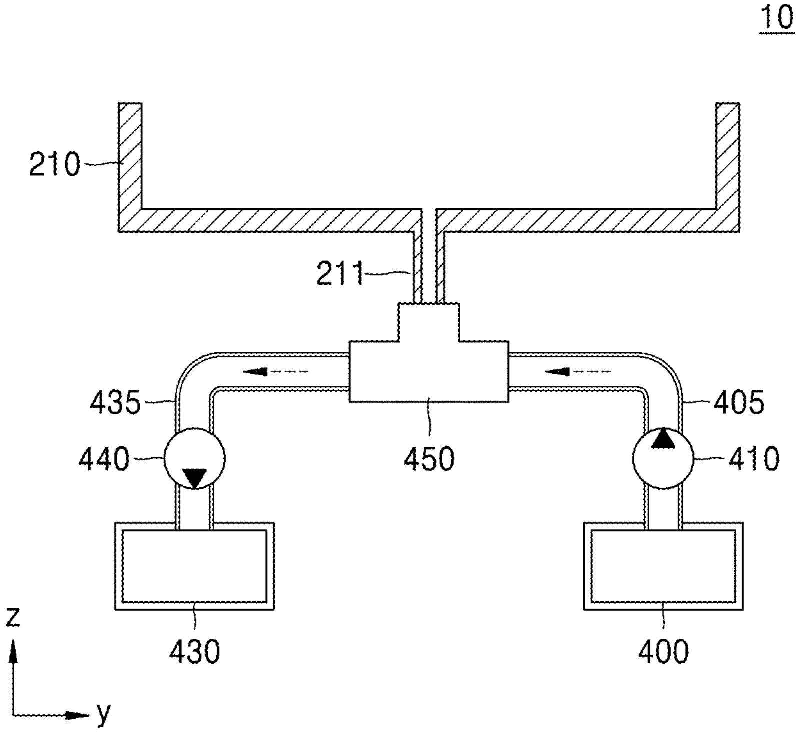
FIG. 6 is a view showing the control of movement of cleaning liquid in an inkjet printing apparatus according to an embodiment.

FIG. 6 is a view showing the control of movement of cleaning liquid in the inkjet printing apparatus 10 according to an embodiment.

Referring to FIG. 6, the inkjet printing apparatus 10 according to an embodiment may include the at least one cap 210, a cleaning liquid return tank 430, a cleaning liquid discharge path 435, a second cleaning liquid pump 440, and a 3-way valve 450.

At least one of elements of the inkjet printing apparatus 10 illustrated in FIG. 6 may be the same as or similar to at least one of the elements of the inkjet printing apparatus 10 of FIGS. 1 and 3, and in the following description, redundant descriptions are omitted.

The cleaning liquid return tank 430 may be arranged outside an inkjet print head (e.g., the inkjet print head 100 of FIG. 1), and may contain the cleaning liquid discharged from the at least one cap 210. The cleaning liquid return tank 430 may be connected to or communicated with the accommodation space of the at least one cap 210 (e.g., the accommodation space 210*i* of FIG. 2).

The cleaning liquid return tank 430 may be fluid connected to or communicated with the accommodation space of the at least one cap 210 through the cleaning liquid discharge path 435, and the cleaning liquid accommodated in the accommodation space of the at least one cap 210 may flow in a direction from the at least one cap 210 toward the cleaning liquid return tank 430 along the cleaning liquid discharge path 435.

The second cleaning liquid pump 440 may be arranged on the cleaning liquid discharge path 435. The second cleaning liquid pump 440 may provide a force to flow the cleaning liquid accommodated in the accommodation space of the at least one cap 210 in a direction toward the cleaning liquid return tank 430. The cleaning liquid accommodated in the accommodation space of the at least one cap 210 may flow in a direction toward the cleaning liquid return tank 430 by the force provided by the second cleaning liquid pump 440.

The cleaning liquid inlet 211 of the at least one cap 210 may be connected to the cleaning liquid supply path 405 and the cleaning liquid discharge path 435 through 3-way valve 450. The 3-way valve 450 may control the flow of the cleaning liquid between the cleaning liquid inlet 211, the cleaning liquid supply path 405, and the cleaning liquid discharge path 435. The 3-way valve 450 may be physically controlled by a user or a separate configuration, or electrically connected to a processor (e.g., the processor 610 of FIG. 3) and controlled by the processor.

In a general state in which the cleaning liquid is accommodated in the at least one cap 210, the 3-way valve 450 may close the cleaning liquid inlet 211. Accordingly, the cleaning liquid accommodated in the at least one cap 210 may be prevented from flowing back through the cleaning liquid inlet 211 so as not to escape from the at least one cap 210.

When the cleaning liquid is supplied to the at least one cap 210, the 3-way valve 450 may close the cleaning liquid discharge path 435 and open the cleaning liquid inlet 211 and the cleaning liquid supply path 405. Accordingly, the cleaning liquid stored in the cleaning liquid reservoir 400 may move along the cleaning liquid supply path 405, and then, move to not the cleaning liquid discharge path 435, but the cleaning liquid inlet 211, so as to be accommodated in the accommodation space of the at least one cap 210. In this state, the first cleaning liquid pump 410 may provide a force to move the cleaning liquid.

When the cleaning liquid is discharged from the at least one cap 210, the 3-way valve 450 may close the cleaning liquid supply path 405 and open the cleaning liquid inlet 211 and the cleaning liquid discharge path 435. Accordingly, the cleaning liquid accommodated in the accommodation space of the at least one cap 210 may move through the cleaning liquid inlet 211, and then, move to not the cleaning liquid supply path 405, but the cleaning liquid discharge path 435, so as to be contained in the cleaning liquid return tank 430. In this state, the second cleaning liquid pump 440 may provide a force to move the cleaning liquid.

According to an embodiment, as the at least one cap 210 includes only the cleaning liquid inlet 211 without a separate outlet, and the opening/closing of the cleaning liquid inlet 211 is controlled through one 3-way valve 450, the supply and discharge of the cleaning liquid may be easily managed, and the introduction of air into the accommodation space of the at least one cap 210 may be reduced.

Figure 7:
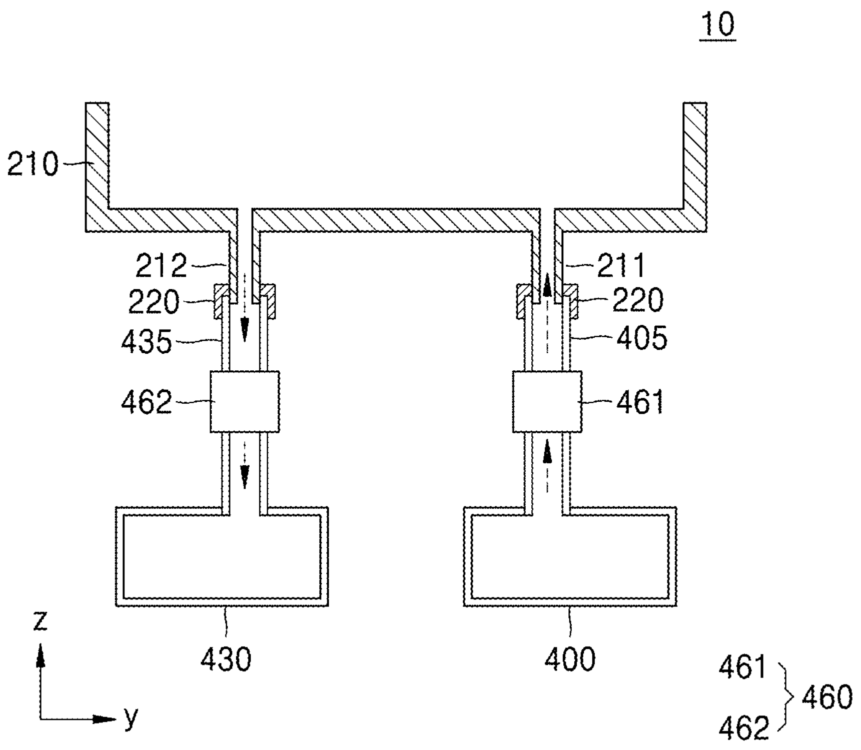
FIG. 7 is a view showing the control of movement of cleaning liquid in an inkjet printing apparatus according to another embodiment.

FIG. 7 is a view showing the control of movement of cleaning liquid in the inkjet printing apparatus 10 according to another embodiment.

Referring to FIG. 7, the inkjet printing apparatus 10 according to another embodiment may include the at least one cap 210, a sealing member 220, the cleaning liquid return tank 430, the cleaning liquid discharge path 435, the second cleaning liquid pump (not shown), and a 1-way valve 460.

At least one of elements of the inkjet printing apparatus 10 illustrated in FIG. 7 may be the same as or similar to at least one of the elements of the inkjet printing apparatus 10 of FIG. 6, and in the following description, redundant descriptions are omitted.

The at least one cap 210 may include the cleaning liquid inlet 211 to introduce the cleaning liquid into an accommodation space (e.g., the accommodation space 210*i* of FIG. 2) and a cleaning liquid outlet 212 to discharge the cleaning liquid accommodated in the accommodation space to the outside.

The cleaning liquid inlet 211 and the cleaning liquid outlet 212 may be formed by penetrating the at least one cap 210. The cleaning liquid inlet 211 may be connected to the cleaning liquid reservoir 400 through the cleaning liquid supply path 405. The cleaning liquid outlet 212 may be connected to the cleaning liquid return tank 430 through the cleaning liquid discharge path 435.

A first cleaning liquid pump (e.g., the first cleaning liquid pump 410 of FIG. 6) may be arranged on the cleaning liquid supply path 405. The cleaning liquid may be moved from the cleaning liquid reservoir 400 toward the at least one cap 210 by the force of the first cleaning liquid pump. A second cleaning liquid pump (e.g., the second cleaning liquid pump 440 of FIG. 6) may be arranged on the cleaning liquid discharge path 435. The cleaning liquid may be moved from the accommodation space of the at least one cap 210 toward the cleaning liquid return tank 430 by the force of the second cleaning liquid pump.

The sealing member 220 may seal a connection portion of the cleaning liquid inlet 211 and the cleaning liquid supply path 405 and/or a connection portion of the cleaning liquid outlet 212 and the cleaning liquid discharge path 435. The sealing member 220 may prevent the flow in/out of a fluid through the connection portion. In other words, the sealing member 220 may block fluid communication between the accommodation space of the at least one cap 210 and the outside of the at least one cap 210.

The 1-way valve 460 may be arranged on each of the cleaning liquid supply path 405 and the cleaning liquid discharge path 435. The 1-way valve 460 may be physically controlled by a user or a separate configuration, or may be electrically connected to a processor (e.g., the processor 610 of FIG. 3) and controlled by the processor.

The 1-way valve 460 may include a first 1-way valve 461 and a second 1-way valve 462. The first 1-way valve 461 arranged on the cleaning liquid supply path 405 may open the cleaning liquid supply path 405 when the cleaning liquid is supplied to the at least one cap 210, and close the cleaning liquid supply path 405 otherwise. The second 1-way valve 462 arranged on the cleaning liquid discharge path 435 may close the cleaning liquid discharge path 435 when the cleaning liquid is discharged from the at least one cap 210, and close the cleaning liquid supply path 405 otherwise.

According to another embodiment, the at least one cap 210 may be provided with the cleaning liquid inlet 211 and the cleaning liquid outlet 212, and the opening/closing of the cleaning liquid inlet 211 and the cleaning liquid outlet 212 are controlled by the 1-way valve 460, that is, respectively by the first 1-way valve 461 and the second 1-way valve 462, and thus, the supply and discharge of the cleaning liquid may be accurately adjusted so that the introduction of air into the accommodation space of the at least one cap 210 may be reduced.

Furthermore, the connection portion of the cleaning liquid inlet 211 and the cleaning liquid supply path 405, and the connection portion of the cleaning liquid outlet 212 and the cleaning liquid discharge path 435, are each sealed by the sealing member 220, and thus, the introduction of air into the accommodation space of the at least one cap 210 through the connection portions, or the discharge of the cleaning liquid therethrough, may be reduced.

It is necessary that the remaining amount of the cleaning liquid accommodated in the at least one cap 210 may be maintained enough to contact a nozzle (e.g., the at least one nozzle 110 of FIG. 1) of the inkjet print head (e.g., the inkjet print head 100 of FIG. 1). In the following description, a configuration of adjusting the remaining amount of the cleaning liquid accommodated in the at least one cap 210 is described.

Figure 8A:
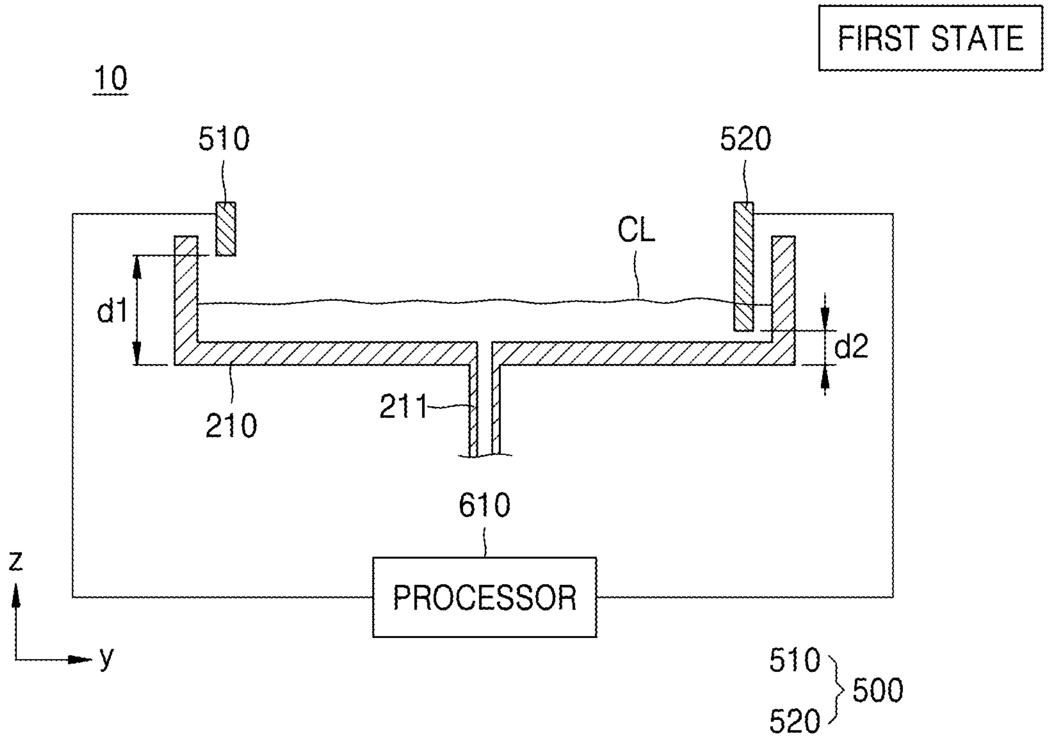
FIG. 8A is a view showing the adjustment of a remaining amount of cleaning liquid in an inkjet printing apparatus according to an embodiment.
Figure 8B:
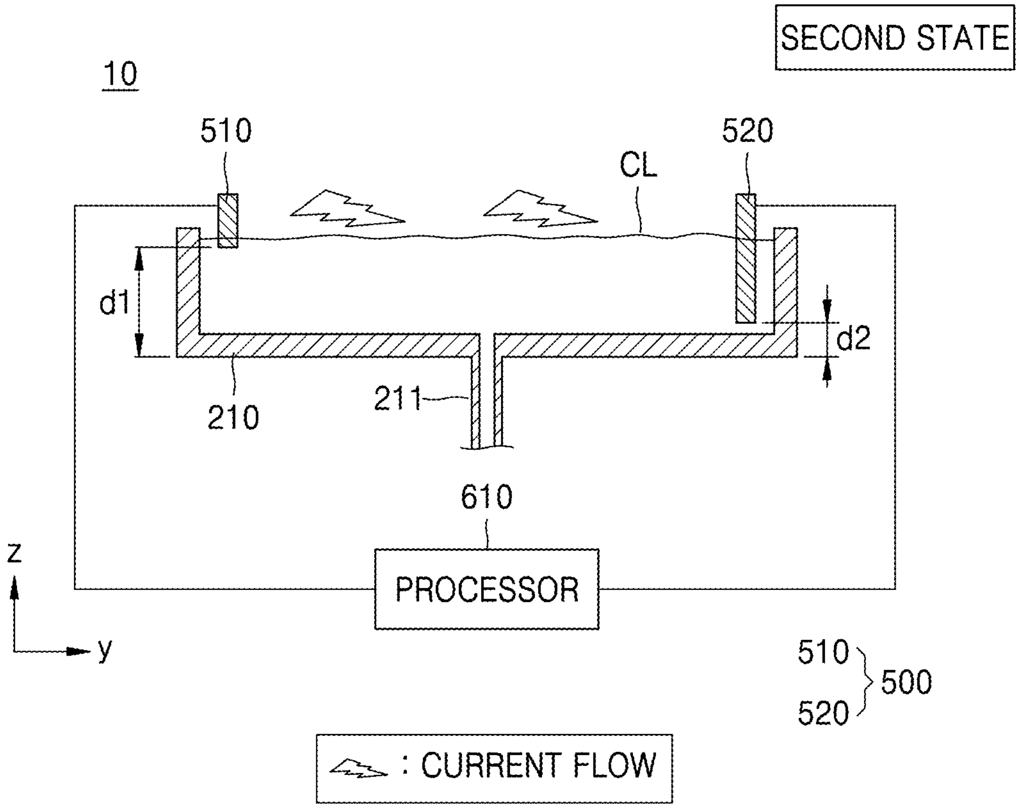
FIG. 8B is a view showing a state in which the remaining amount of cleaning liquid increases in the inkjet printing apparatus of FIG. 8A.

FIG. 8A is a view showing the adjustment of a remaining amount of the cleaning liquid in the inkjet printing apparatus 10 according to an embodiment. FIG. 8B is a view showing a state in which the remaining amount of the cleaning liquid increases in the inkjet printing apparatus 10 of FIG. 8A.

Referring to FIGS. 8A and 8B, the inkjet printing apparatus 10 according to an embodiment may include the at least one cap 210, the remaining amount detection sensor 500, and the processor 610.

At least one of elements of the inkjet printing apparatus 10 illustrated in each of FIGS. 8A and 8B may be the same as or similar to at least one of the elements of the inkjet printing apparatus 10 of FIGS. 1 and 3, and in the following description, redundant descriptions are omitted.

The remaining amount detection sensor 500 of the inkjet printing apparatus 10 according to an embodiment may include a first electrode 510 and a second electrode 520. The first electrode 510 and the second electrode 520 may each be connected to the processor 610.

The first electrode 510 may be spaced apart a first distance d1 from the bottom of the accommodation space of the at least one cap 210 (e.g., the accommodation space 210*i* of FIG. 2). The second electrode 520 may be spaced apart a second distance d2 from the accommodation space of the at least one cap 210. The first distance d1 and the second distance d2 may be different from each other.

According to an embodiment, as the first distance d1 is greater than the second distance d2, the first electrode 510 may be arranged farther apart from the bottom of the accommodation space of the at least one cap 210, compared with the second electrode 520.

The cleaning liquid CL accommodated in the at least one cap 210 may fill the accommodation space of the at least one cap 210 from the bottom thereof. As the amount of the cleaning liquid CL accommodated in the at least one cap 210 increases, a liquid surface formed by the cleaning liquid CL may be apart from the bottom of the accommodation space.

As the cleaning liquid CL is supplied to the at least one cap 210 and the liquid surface formed by the cleaning liquid CL moves away from the bottom of the accommodation space of the at least one cap 210, the second electrode 520 of the two electrodes of the remaining amount detection sensor 500 may first contact the cleaning liquid CL. Referring to FIG. 8A, illustrated is a first state in which the cleaning liquid CL is in contact with the second electrode 520 of the two electrodes of the remaining amount detection sensor 500. In the first state, the cleaning liquid CL accommodated in the at least one cap 210 is not in contact with the first electrode 510.

In the first state, as the cleaning liquid CL is further supplied to the at least one cap 210, not only the second electrode 520, but also the first electrode 510 may contact the cleaning liquid CL. Referring to FIG. 8B, illustrated is a second state in which the cleaning liquid CL is in contact with both electrodes of the remaining amount detection sensor 500.

The processor 610 may apply a voltage to the first electrode 510 and the second electrode 520 connected to both ends of the processor 610. In the first state in which the cleaning liquid CL is not in contact with the first electrode 510, and thus, the first electrode 510 does not contact the cleaning liquid CL and is in an electrically open state, even when the processor 610 applies a voltage to the electrodes, no current flows.

In the second state in which the cleaning liquid CL is in simultaneous contact with the first electrode 510 and the second electrode 520, the first electrode 510 and the second electrode 520 may be connected by the cleaning liquid CL to form a closed circuit together with the processor 610. A current may flow between the first electrode 510 and the second electrode 520 through the cleaning liquid CL. The processor 610 may determine, by detecting the current, that the cleaning liquid CL fills the accommodation space of the at least one cap 210 from the bottom thereof to the location of the first electrode 510 or higher.

Compared with a distance (hereinafter, referred to as the distance to the nozzle) from the bottom surface of the accommodation space of the at least one cap 210 to a nozzle (e.g., the at least one nozzle 110 of FIG. 1), when the first electrode 510 is arranged such that the first distance d1 is the same as or greater than the distance to the nozzle, and the second electrode 520 is arranged such that the second distance d2 is less than the distance to the nozzle or close to 0, a current may flow between the two electrodes only when the cleaning liquid CL is in contact with the nozzle.

When no current flows between the first electrode 510 and the second electrode 520, the processor 610 may operate a first cleaning liquid pump (e.g., the first cleaning liquid pump 410 of FIG. 3) to supply the cleaning liquid CL to the at least one cap 210.

When a current flows between the first electrode 510 and the second electrode 520, the processor 610 may detect the current and control the first cleaning liquid pump to stop the supply of the cleaning liquid CL. Furthermore, when a current flows in the processor 610 for a preset time or more, the processor 610 may operate a second cleaning liquid pump (e.g., the second cleaning liquid pump 440 of FIG. 6) to replace the cleaning liquid CL accommodated in the at least one cap 210 with a new cleaning liquid. The preset time may mean a time value preset by a user for replacement of the cleaning liquid CL.

Accordingly, the processor 610 may adjust the remaining amount of the cleaning liquid CL accommodated in the at least one cap 210, based on the current flowing between the first electrode 510 and the second electrode 520. The method in which the processor 610 determines the remaining amount of cleaning liquid is not limited to the present embodiment. In another example, the remaining amount detection sensor 500 may include a separate signal generation portion, and may generate different signals depending on the generation of a current between the first electrode 510 and the second electrode 520. The processor 610 may determine and adjust the remaining amount of cleaning liquid based on different signals of the remaining amount detection sensor 500.

Figure 9:
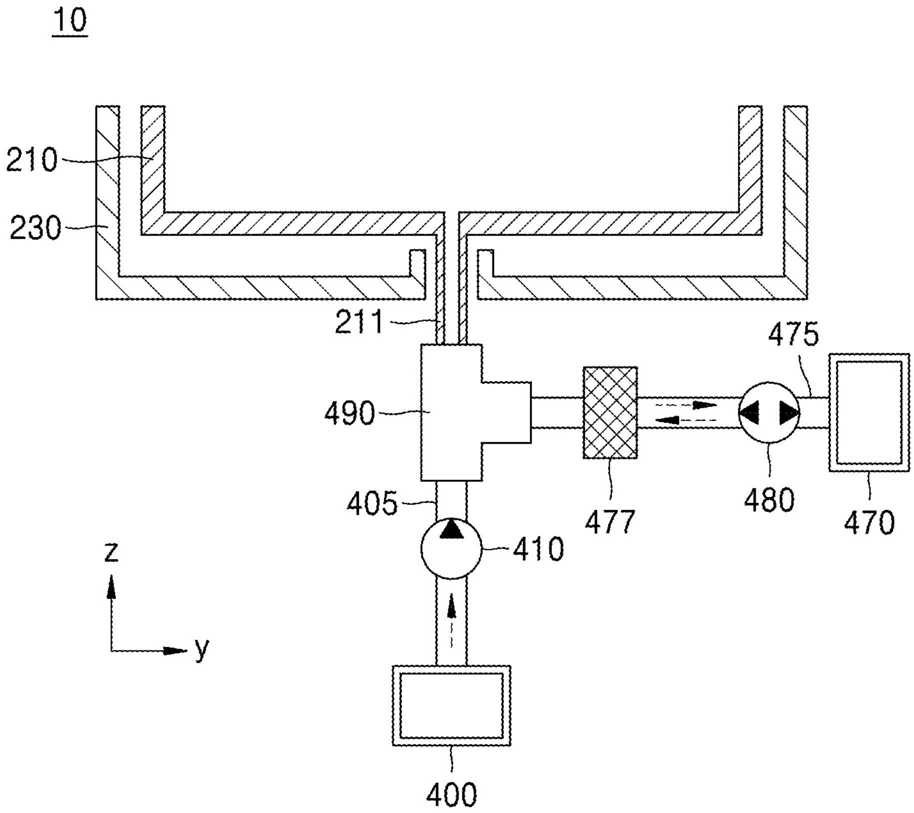
FIG. 9 is a view showing the adjustment of a remaining amount of cleaning liquid in an inkjet printing apparatus according to another embodiment.

FIG. 9 is a view showing the adjustment of a remaining amount of cleaning liquid in the inkjet printing apparatus 10 according to another embodiment.

Referring to FIG. 9, the inkjet printing apparatus 10 according to another embodiment may include the at least one cap 210, a tray 230, a temporary reservoir 470, a 2-way pump 480, and an auxiliary valve 490.

In the inkjet printing apparatus 10 according to another embodiment, cleaning liquid is replaced by allowing the cleaning liquid to overflow to the outside of the accommodation space of the at least one cap 210 (e.g., the accommodation space 210*i* of FIG. 2), and the remaining amount of cleaning liquid may be adjusted by sucking the cleaning liquid accommodated in the at least one cap 210 through the cleaning liquid inlet 211.

When the cleaning liquid is excessively supplied to the accommodation space of the at least one cap 210, the cleaning liquid may overflow from the accommodation space of the at least one cap 210. At least a part of the existing cleaning liquid accommodated in the at least one cap 210 may overflow from the accommodation space to be discharged to the outside of the at least one cap 210. When the cleaning liquid is continuously supplied to the at least one cap 210 through the cleaning liquid supply path 405, the cleaning liquid accommodated in the at least one cap 210 may be replaced with a new cleaning liquid.

The tray 230 may be arranged adjacent to the at least one cap 210 in the vicinity of the at least one cap 210 to accommodate the cleaning liquid overflowing from the at least one cap 210. The tray 230 may discharge the cleaning liquid to the outside through a separate outlet (not shown). The tray 230 does not interfere with the at least one cap 210 and the cleaning liquid supply path 405, and may have various shapes for accommodating the cleaning liquid overflowing from the at least one cap 210.

When the cleaning liquid is replaced by a method of overflowing the cleaning liquid from the accommodation space of the at least one cap 210, a separate cleaning liquid outlet may not be arranged in the at least one cap 210. Considering that air may be introduced into the accommodation space of the at least one cap 210 through the cleaning liquid outlet 212 that penetrates the at least one cap 210, as there is no separate cleaning liquid outlet, the introduction of air into the accommodation space of the at least one cap 210 may be reduced.

After allowing the cleaning liquid to overflow from the at least one cap 210, to adjust the remaining amount of the cleaning liquid accommodated in the accommodation space of the at least one cap 210 to an appropriate amount, a certain amount of the cleaning liquid applied to the at least one cap 210 through the cleaning liquid inlet 211 may be returned through the cleaning liquid inlet 211. The appropriate amount may mean an amount that the cleaning liquid does not overflow from the at least one cap 210 and maintains a contact with a nozzle (e.g., the at least one nozzle 110 of FIG. 1), and the certain amount may mean a preset amount that should be returned so that the remaining amount of the cleaning liquid accommodated in the at least one cap 210 approaches the appropriate amount.

The temporary reservoir 470 may temporarily hold the cleaning liquid returned through the cleaning liquid inlet 211. The temporary reservoir 470 may be fluid connected to or communicated with the accommodation space of the at least one cap 210 through a temporary return path 475.

The cleaning liquid held in the temporary reservoir 470 may be moved again to the accommodation space of the at least one cap 210. The temporary return path 475 may be a path through which the cleaning liquid returned from the at least one cap 210 is moved, or a path through which the cleaning liquid traveling toward the at least one cap 210 is moved.

The 2-way pump 480 may be arranged on the temporary return path 475. The 2-way pump 480 may provide a force to flow the cleaning liquid between the temporary reservoir 470 and the accommodation space of the at least one cap 210. In this state, the 2-way pump 480 may control not only the flow of the cleaning liquid from the accommodation space of the at least one cap 210 to the temporary reservoir 470, but also the flow of the cleaning liquid from the temporary reservoir 470 to the accommodation space of the at least one cap 210.

The cleaning liquid inlet 211 of the at least one cap 210 may be connected to the cleaning liquid supply path 405 and the temporary return path 475 through the auxiliary valve 490 The auxiliary valve 490 may control the movement of the cleaning liquid between the cleaning liquid inlet 211, the cleaning liquid supply path 405, and the temporary return path 475. The auxiliary valve 490 may be physically controlled by a user or a separate configuration, or may be electrically connected to a processor (e.g., the processor 610 of FIG. 3) and controlled by the processor.

In a general state in which the cleaning liquid is accommodated in the at least one cap 210, the auxiliary valve 490 may close the cleaning liquid inlet 211. Accordingly, the cleaning liquid accommodated in the at least one cap 210 may be prevented from flowing back through the cleaning liquid inlet 211 and escaping from the at least one cap 210.

When the cleaning liquid is supplied to the at least one cap 210, the auxiliary valve 490 may close the temporary return path 475, and open the cleaning liquid inlet 211 and the cleaning liquid supply path 405. Accordingly, the cleaning liquid stored in the cleaning liquid reservoir 400 may be moved along the cleaning liquid supply path 405 to the cleaning liquid inlet 211, not to the temporary return path 475, and then accommodated in the accommodation space of the at least one cap 210. In this state, the first cleaning liquid pump 410 may provide a force for moving the cleaning liquid.

When a certain amount of the cleaning liquid is returned through the cleaning liquid inlet 211 to adjust the remaining amount of the cleaning liquid accommodated in the at least one cap 210 to an appropriate amount, the auxiliary valve 490 may close the cleaning liquid supply path 405 and open the cleaning liquid inlet 211 and the temporary return path 475. Accordingly, the cleaning liquid accommodated in the accommodation space of the at least one cap 210 may be moved through the cleaning liquid inlet 211 to the temporary return path 475, not to the cleaning liquid supply path 405, and then held in the temporary reservoir 470. In this state, the 2-way pump 480 may provide a force for moving the cleaning liquid.

When the cleaning liquid held in the temporary reservoir 470 is resupplied to the at least one cap 210, the auxiliary valve 490 may close the cleaning liquid supply path 405 and open the cleaning liquid inlet 211 and the temporary return path 475. Accordingly, the cleaning liquid held in the temporary reservoir 470 may be moved along the temporary return path 475 to the cleaning liquid inlet 211, not to the cleaning liquid supply path 405, and then accommodated in the accommodation space of the at least one cap 210. In this state, the 2-way pump 480 may provide a force for moving the cleaning liquid.

The inkjet printing apparatus 10 according to another embodiment may further include a filter 477 arranged on the temporary return path 475. The filter 477 may remove foreign materials of the cleaning liquid passing through the temporary return path 475.

Accordingly, even when the cleaning liquid moving from the at least one cap 210 toward the temporary reservoir 470 includes foreign materials, the foreign materials in the cleaning liquid traveling the temporary reservoir 470 toward the at least one cap 210 may be removed by the filter 477 so as to be supplied to the accommodation space of the at least one cap 210 in a clean state.

According to another embodiment, only the cleaning liquid inlet 211 is arranged in the at least one cap 210 without a separate outlet, and the opening/closing of the cleaning liquid inlet 211 is adjusted through one auxiliary valve 490, the supply and return of the cleaning liquid may be easily managed, and the introduction of air into the accommodation space of the at least one cap 210 may be reduced.

Furthermore, according to another embodiment, to adjust the remaining amount of the cleaning liquid accommodated in the at least one cap 210, a certain amount of the cleaning liquid is temporarily returned and the cleaning liquid fielded through the filter 477 is resupplied to the at least one cap 210, so that the cleaning liquid may be efficiently used.

According to the inkjet printing apparatus according to an embodiment, even when power is not supplied to the maintenance unit for a long time, the nozzle is not clogged and maintains a wet state so that high print quality may be maintained.

Furthermore, according to the inkjet printing apparatus according to embodiments, as the ink remaining in the nozzle is not exposed to air, the nozzle may stably spray ink for a long time without a clogging phenomenon due to the ink coagulation.

The effects of the present disclosure are not limited to the above-described effects, and other various effects that are not described in the specification may be clearly understood from the following descriptions by one skilled in the art to which the present disclosure belongs.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the disclosure as defined by the following claims.

What is claimed is:

1. An inkjet printing apparatus comprising:

an inkjet print head including at least one nozzle configured to spray ink onto a print medium; and a cap capable of being coupled to at least one area of the inkjet print head, and configured to protect the at least one nozzle when coupled to the inkjet print head, wherein the cap includes an accommodation space opened toward the at least one nozzle, and cleaning liquid for preventing ink from coagulating in the at least one nozzle is accommodated in the accommodation space, and wherein the accommodation space is filled with the cleaning liquid such that the at least one nozzle is immersed in the cleaning liquid when the cap is coupled to the inkjet print head.

2. The inkjet printing apparatus of claim 1, further comprising:

a cleaning liquid reservoir storing the cleaning liquid to be supplied to the cap;

a cleaning liquid supply path connecting the cleaning liquid reservoir and the cap to each other; and a cleaning liquid pump arranged on the cleaning liquid supply path and providing a force for flowing the cleaning liquid stored in the cleaning liquid reservoir toward the cap.

3. The inkjet printing apparatus of claim 2, further comprising a maintenance unit coupled to a lower portion of the inkjet print head and accommodating at least a part of the cap, wherein the cleaning liquid reservoir is arranged below the cap, inside the maintenance unit.

4. The inkjet printing apparatus of claim 2, further comprising an ink reservoir arranged outside the inkjet print head and storing ink to be supplied to the inkjet print head, wherein the ink reservoir and the cleaning liquid reservoir are arranged adjacent to each other.

5. The inkjet printing apparatus of claim 1, wherein the inkjet print head further comprises one or more ink chambers arranged inside the inkjet print head and storing ink, and a number of the caps is same as a number of the ink chambers.

6. The inkjet printing apparatus of claim 1, further comprising a cleaning liquid sprayer configured to spray the cleaning liquid to the accommodation space.

7. The inkjet printing apparatus of claim 1, wherein the cap comprises a cleaning liquid inlet that penetrates the cap and is configured to introduce the cleaning liquid into the accommodation space.

8. The inkjet printing apparatus of claim 7, further comprising:

a cleaning liquid supply path configured to supply the cleaning liquid to the cap;

a cleaning liquid discharge path configured to discharge the cleaning liquid from the cap; and a 3-way valve connected to the cleaning liquid inlet, the cleaning liquid supply path, and the cleaning liquid discharge path and configured to control movement of a fluid.

9. The inkjet printing apparatus of claim 7, wherein the cap further comprises a cleaning liquid outlet penetrating the cap and configured to discharge the cleaning liquid accommodated in the accommodation space to outside of the cap.

10. The inkjet printing apparatus of claim 9, further comprising a sealing member arranged adjacent to at least one of the cleaning liquid inlet and the cleaning liquid outlet and blocking fluid communication between the accommodation space and outside of the cap.

11. The inkjet printing apparatus of claim 9, further comprising:

a cleaning liquid supply path connected to the cleaning liquid inlet and configured to supply the cleaning liquid to the cap;

a cleaning liquid discharge path connected to the cleaning liquid outlet and configured to discharge the cleaning liquid from the cap; and a 1-way valve arranged on at least one of the cleaning liquid supply path and the cleaning liquid discharge path and configured to control movement of a fluid.

12. The inkjet printing apparatus of claim 1, further comprising:

a remaining amount detection sensor configured to generate a signal in response to a change in a remaining amount of the cleaning liquid accommodated in the accommodation space; and a processor configured to control a remaining amount of the cleaning liquid accommodated in the accommodation space, based on the signal generated by the remaining amount detection sensor.

13. The inkjet printing apparatus of claim 12, wherein the remaining amount detection sensor comprises: a first electrode spaced apart by a first distance from a bottom of the accommodation space; and a second electrode spaced apart by a second distance from the bottom of the accommodation space, the second distance being different from the first distance, the first electrode and the second electrode are each capable of contacting the cleaning liquid according to the remaining amount of the cleaning liquid accommodated in the accommodation space, and when the first electrode and the second electrode each contact the cleaning liquid, the signal is based on a current flowing between the first electrode, the cleaning liquid, and the second electrode.

14. The inkjet printing apparatus of claim 1, further comprising a tray arranged adjacent to the cap and configured to accommodate the cleaning liquid overflowing from the accommodation space.

15. The inkjet printing apparatus of claim 1, further comprising:

a temporary reservoir configured to temporarily hold the cleaning liquid;

a temporary return path connecting the temporary reservoir and the cap to each other;

a 2-way pump arranged on the temporary return path and configured to provide a force to allow the cleaning liquid accommodated in the cap to flow toward the temporary reservoir and to allow the cleaning liquid held in the temporary reservoir to flow toward the cap; and a filter configured to remove foreign materials from the cleaning liquid flowing along the temporary return path.

16. The apparatus of claim 1, wherein the cap comprises:

a cleaning liquid inlet penetrating the cap and connected to a cleaning liquid supply path, and a cleaning liquid outlet penetrating the cap and connected to a cleaning liquid discharge path, wherein a sealing member is arranged adjacent to at least one of the cleaning liquid inlet or the cleaning liquid outlet s configured to block fluid communication between the accommodation space and outside of the cap, and wherein at least one 1-way valve is arranged on at least one of the cleaning liquid supply path or the cleaning liquid discharge path to control movement of the cleaning liquid.

17. The apparatus of claim 16, wherein the at least one one-way valve comprises a first 1-way valve arranged on the cleaning liquid supply path and a second 1-way valve arranged on the cleaning liquid discharge path.

* * * * *